United States Patent [19]

Grüner et al.

[11] Patent Number: 5,032,031

[45] Date of Patent: Jul. 16, 1991

[54] DRIVE CIRCUIT FOR A MATRIX PRINTER

[75] Inventors: Manfred Grüner, Ulm; Bernd Gugel, Ulm-Einsingen; Johann Stempfle, Pfaffenhofen, all of Fed. Rep. of Germany

[73] Assignee: Mannesmann Aktiengesellschaft, Düsseldorf, Fed. Rep. of Germany

[21] Appl. No.: 306,807

[22] Filed: Feb. 3, 1989

[30] Foreign Application Priority Data

Feb. 5, 1988 [EP] European Pat. Off. ........ 88730025.9

[51] Int. Cl.⁵ .............................................. B41J 2/30
[52] U.S. Cl. .................................. 400/157.2; 361/152
[58] Field of Search ............... 400/166, 167, 157.2, 400/157.3; 361/152-154

[56] References Cited

U.S. PATENT DOCUMENTS

| 4,348,119 | 9/1982 | Carson | 400/167 |
| 4,485,425 | 11/1984 | Gruner | 400/157.2 |
| 4,835,655 | 5/1989 | Ricci | 400/157.2 |

FOREIGN PATENT DOCUMENTS

| 0028090 | 5/1981 | European Pat. Off. | 361/154 |
| 3139502 | 4/1983 | Fed. Rep. of Germany | 400/157.2 |
| 54611 | 3/1983 | Japan | 400/157.2 |
| 141570 | 6/1986 | Japan | 400/167 |
| 59051 | 3/1987 | Japan | 400/157.2 |
| 122760 | 6/1987 | Japan | 400/167 |

Primary Examiner—David A. Wiecking
Assistant Examiner—Steven S. Kelley
Attorney, Agent, or Firm—Horst M. Kasper

[57] ABSTRACT

A drive system for printers, in particular for matrix printers of a needle-type construction or hammer-type construction, exhibits an electromagnetic coil (L) coordinated to each printing element (6), as well as a magnetizable armature disposed opposite to each electromagnetic core (2), where the print element (6) is attached to the magnetizable armature, where the armature, in case of switched-off electromagnetic coil (L), is maintained in a rearward launching position, and where during a current-passing electromagnetic coil (L) the armature is launched with the print element (6) into a forward-disposed print position. In order to further increase the driving frequency for such electromagnetic coils (L), it is disclosed that a discharge time (t3), for the feeding back of the discharge current from the capacitor (C) into the electromagnetic coil (L) and via a resistor (R3) and a transistor (V2) into the capacitor (C), is provided following to a charge time (t2) for the capacitor (C), which charge time (t2) follows to a first pulse time (t1). Such a drive system is suitable both for electromagnetic-coil permanent-magnet systems as well as electromagnetic-coil clapper-armature systems.

7 Claims, 3 Drawing Sheets

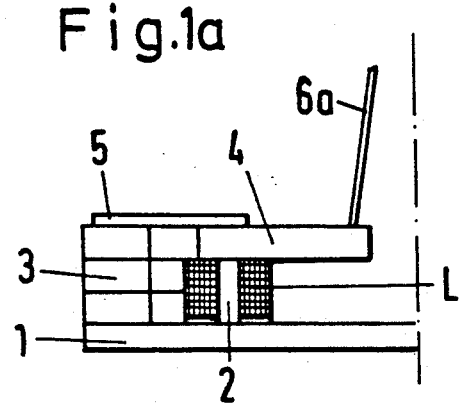
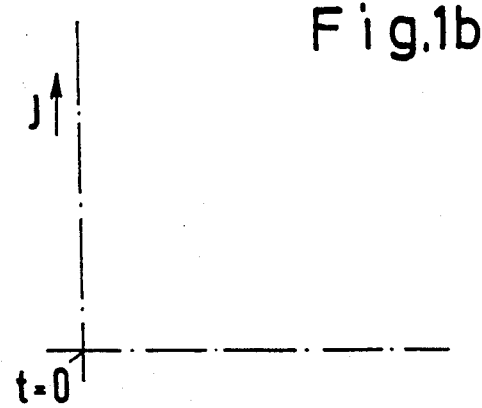
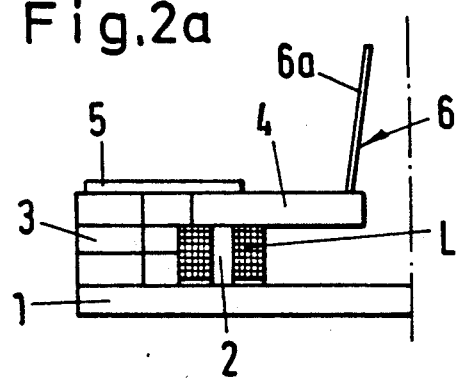
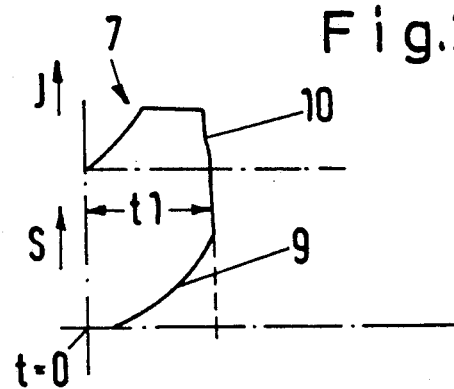
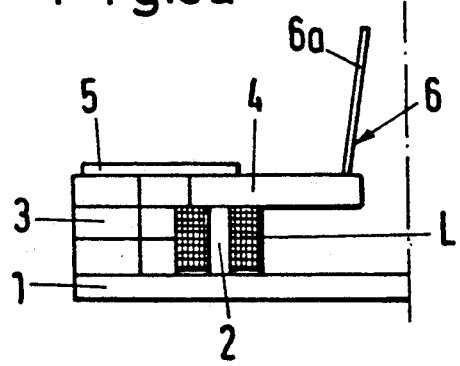
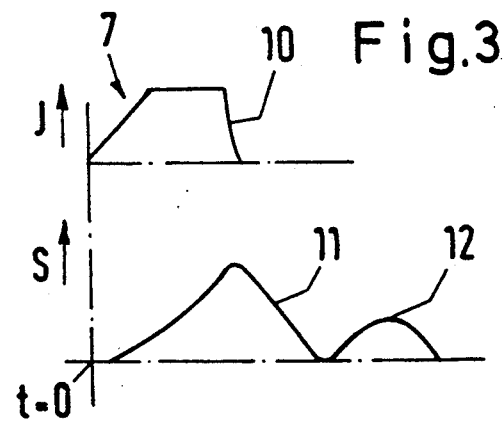
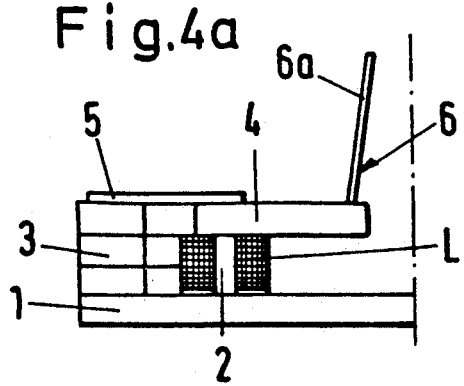
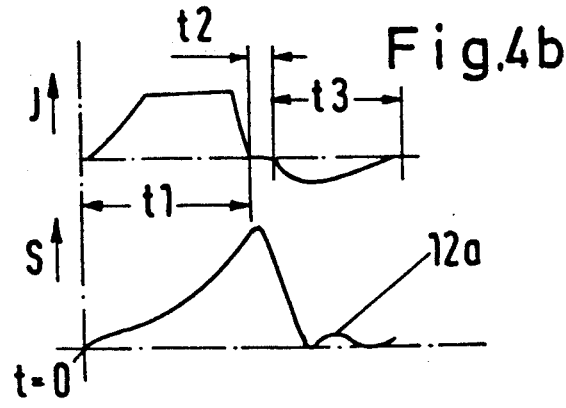

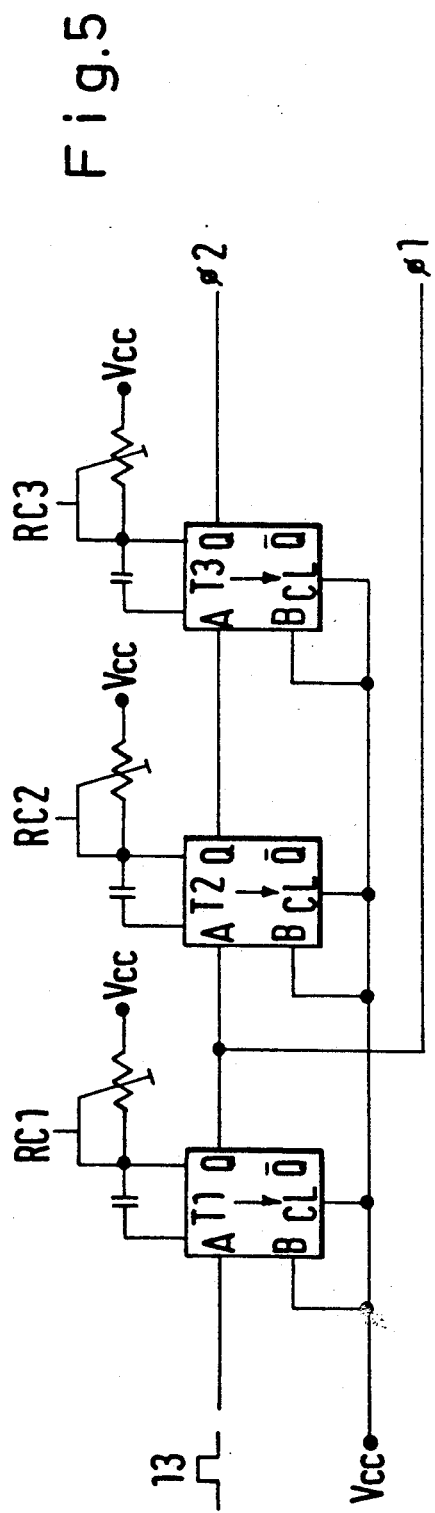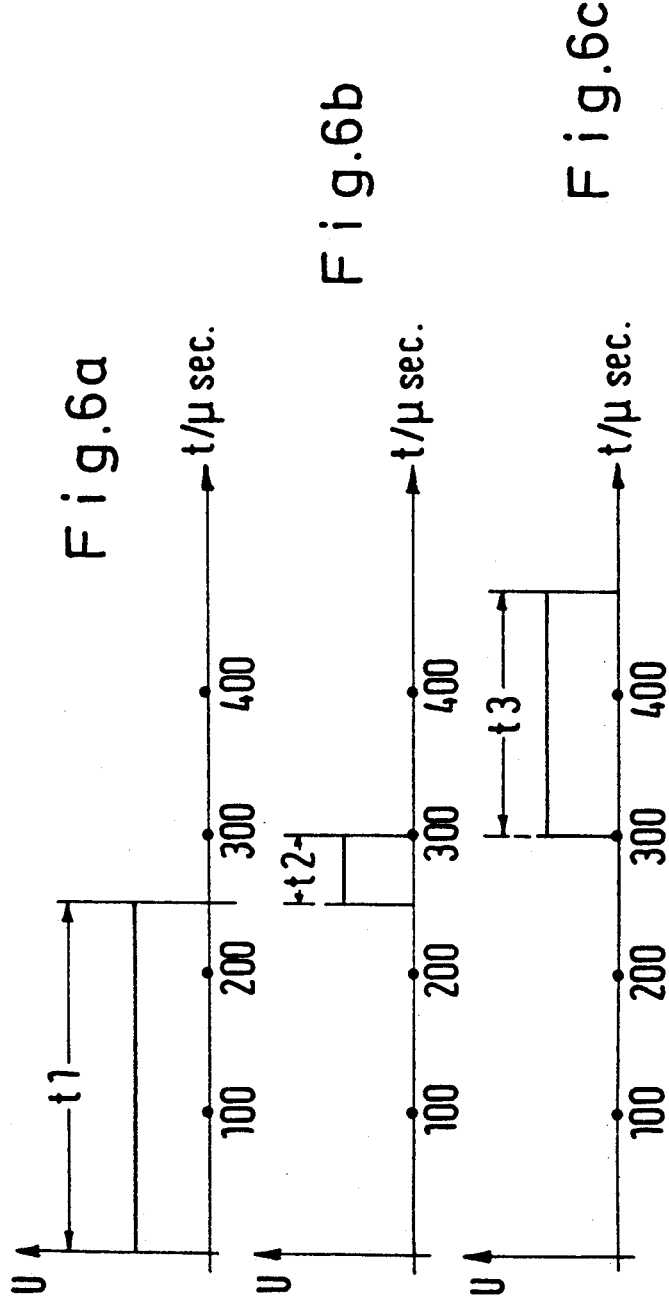

DRIVE CIRCUIT FOR A MATRIX PRINTER

BACKGROUND OF THE INVENTION

1. Field of the Invention

The invention relates to a drive system for a printer, in particular for a matrix printer of a needle-type construction or, respectively of a hammer-type construction, where an electromagnetic coil is coordinated to each printing element.

2. Brief Description of the Background of the Invention Including Prior Art

The electromagnetic coil of a print needle (needle print head) or, respectively of printing hammers (hammer bank printer) is furnished with current during operation in a matrix printer in order to induce and launch the needles or, respectively, the printing hammers, to image characters on the recording carrier via individual dot prints.

The printing element can comprise, in each case, a spring loaded magnetizable armature disposed opposite to the electromagnet core, or, respectively for hinged clapper armature print heads with rigid armature, with, in each case, a print element attached to the armature, and with a permanent magnet. The permanent magnet is permeated in this sense, upon switched-on electromagnetic coil, by the magnetic field of the electromagnetic coil, or a mechanical spring, in the case of a hinged clapper armature print head, that the permanent magnet or, respectively, the mechanical spring, in case of a switched-off electromagnetic coil, retains the spring-loaded armature or, respectively, the rigid armature in a rearward launching position, and that, in case of an electromagnetic coil with a current flow, the magnetic field of the permanent magnet is balanced, or, respectively, the force of the mechanical spring is overcome, and that thereby the spring-loaded armature or, respectively, the rigid armature, is launched or fired with the print element in a forward disposed print position. A current-limiting circuit is employed, where a rapidly rising current is limited via a relatively high voltage, and with a current flank decaying after a first pulse time to zero, as well as with a capacitor storing electrical energies.

The frequency of the system, which includes an electromagnetic coil, a metallic magnet core, an armature spring, as well as a needle attached to the armature spring, in connection with the construction of a character matrix, is directly proportionate to the obtainable writing speed of the printer. The frequency of the system is determined by the time, which the needle requires to pass from the rest position into the working position and back again to the rest position in order to be ready for the next required dot print. This frequency of the magnet system in turn is again very dependent on the time, which is required in order to remove the voltage at the electromagnetic coil. The occurring difficulties during the driving of a magnet system comprise that the current, which passes through the electromagnetic coil during the actual driving time, does not break off immediately after the removal of the drive voltage. The inductivity of the electromagnetic coil tends to maintain the current in the existing direction. Because of this, the voltage rises at the switched-off connection of the electromagnetic coil, as noted in the German Patent DE-PS 31 39 502.

A current-limiting circuit within driver circuits for printers, together with a character-generator or pattern generator, creating print signals and start signals, is known from the German Patent Application Laid Open DE-OS 31 51 242. The print signal and the start signal are connected at the signal input via AND-gates. Furthermore, in each case, monostable trigger circuits are provided and connected to the AND-gates, which trigger circuits, in each case, comprise a time-delay member or a timing element. The outputs of the monostable trigger circuits are separately connected via selection drive gates with the base of the drive transistors. The emitters of the drive transistors are connected via base resistors, in each case, to the base of transistors. The collector of the transistors or, respectively, the emitters of the transistors can be switched at voltage stages. The driver magnet coil for the needles or, respectively, the hammers to be fired, is provided at one of the transistors. Such current-limiting circuits maintain the current at a predetermined level in the end region of a time period of increasing current and are switched off after a time of uniform constant current strength such that the current course at the driver magnet coil forms approximately a non-isosceles trapezoid.

The system, electromagnetic coil-permanent magnet, effects in principle a higher frequency at the matrix print head of a hinged clapper armature construction, such that a constant development of quicker printing print heads could be created. The frequency of such print heads runs about 2 kHz and frequencies of from 3,500 to 4,000 Hz are desired.

SUMMARY OF THE INVENTION

1. Purposes of the Invention

It is an object of the invention to increase the operating frequency of electromagnetic coil-permanent magnet-systems or, respectively, of electromagnetic coil-hinged clapper armature-systems as employed in connection with matrix print heads. It is another object to increase the cycle speed of print elements in a matrix printer.

It is yet a further object of the present invention to remove quickly any remaining energy after completed activation from the coils of electromagnets in print heads.

These and other objects and advantages of the present invention will become evident from the description which follows.

2. Brief Description of the Invention

According to the invention, the initially designated drive system is provided both for permanent magnet heads as well as for hinged clapper armature heads, where a charging time for the capacitor, following to a first pulse time, provides a discharge time for the feeding back of the discharge current from the capacitor into the electromagnetic coil and via a resistor and a transistor into the capacitor. A quick current decrease in the electromagnetic coil is achieved in this case in addition to a variable first pulse time. After a subsequent charging time, a current is sent, which runs through the electromagnetic coil in a direction opposite to the previous current direction, which results in an advantageous amplification and enhancement of the permanent magnet field in this application. The discharge time for the capacitor can be adjustable as desired.

A printer component including a driver circuit comprises a print element assembly. The print element assembly can be a print head or other construction for supporting print elements. Print elements can be needles, hammers, or the like. An electromagnetic coil has a first terminal and is coordinated to each print element. A movable element is associated with each print element. A retaining element retains the movable element in case of a switched-off electromagnetic coil in a rearward launching position. In case of a current-passing electromagnetic coil, the retaining force of the retaining element is overcome. Thereby the movable element is launched with the print element into a forward-disposed print position. A capacitor for storing electric energies, has a first terminal and a second terminal. The first terminal of the capacitor is connected to the first terminal of the electromagnetic coil. A resistor has a first terminal and a second terminal where the second terminal of the resistor is connected to the second terminal of the capacitor. A transistor has a base, an emitter, and a collector, where the base of the transistor is connected to the first terminal of the resistor. A current-limiting circuit is connected to the second terminal of the electromagnetic coil and connected to the base of the transistor. A rapidly rising current is limited by a relatively high voltage, and a current flank decaying to zero after a first pulse time. A discharge time for the feeding back of the discharge current from the capacitor into the electromagnetic coil and via the resistor and the transistor into the capacitor is following a charging time for the capacitor, said charging time occurring subsequent to the first pulse time.

The printer can be a matrix printer of a needle-type construction. The movable element can be a spring-loaded armature magnetizable and disposed opposite to an electromagnetic core. The retaining element can be a permanent magnet, which can be permeated in this sense and equally directed by a magnetic field of the switched-on electromagnetic coil. The permanent magnet, in case of a switched-off electromagnetic coil, can retain the spring-loaded armature in a rearward launching position. In case of a current-passing electromagnetic coil, the magnet field of the permanent magnet can be balanced. Thereby the spring-loaded armature can be launched with the print element into a forward-disposed print position.

The printer can be a matrix printer of a hammer-type construction. The movable element can be a rigid armature for a hinged clapper-armature print head with, in each case, a print element attached to the rigid armature. The retaining element can be a mechanical spring. The mechanical spring, in case of a switched-off electromagnetic coil, can retain the rigid armature in a rearward launching position. In case of a current-passing electromagnetic coil, the force of the mechanical spring can be overcome. Thereby the rigid armature can be launched with the print element into a forward-disposed print position.

The discharge time for the capacitor can be adjustably set.

The current-limiting circuit can include a first pre-driving stage, a second pre-driving stage and a third transistor. A first digital timing element can have an input terminal to be connected to a character-generator and a first output terminal for a pulse time signal and can include a first delay member for the pulse time. A second digital timing element can include a second delay member for the charge time connected to the first digital timing element. A third digital timing element can include a third delay member for the discharge time connected to the second digital timing element. A first output signal at the first output terminal of the first digital timing element can be generated from an input signal at the input of the first timing member and serves for the control of the pre-driving stage. A second output signal can be generated via the second digital timing member and the third digital timing member. Said second output signal can be connected via the second pre-driving stage and a third transistor, thereby forming a charging or, respectively, discharging stage for the capacitor or, respectively the electromagnetic coil.

The charging or, respectively, discharge stage can further comprise a Zener diode connected in parallel to the capacitor. The second transistor can have its base connected to the collector of the third transistor. Said second transistor can be connected with its collector connection via the resistor, which can be employed as an adjustable resistor, to the capacitor and to the first Zener diode. The second transistor can be connected with its base via a third diode with the capacitor and with its emitter via a second diode with the Zener diode and with the electromagnetic coil. The electromagnetic coil can be connected with its first terminal to the capacitor. The second terminal of the capacitor can be connected to a second terminal of a first Zener diode. The electromagnetic coil can be connected with its first terminal to a first terminal of the first Zener diode.

According to a further aspect of the invention, a drive circuit for a coil in a printer comprises a first digital timing element having an input terminal to be connected to a character-generator and an output terminal for a pulse time signal and including a first delay member for the pulse time. A second digital timing element has an input and an output and includes a second delay member for the charge time signal connected with the input to the output of the first digital timing element. A third digital timing element has an input and an output and includes a third delay member for the discharge time signal connected with the input to the output of the second digital timing element. A pre-driving stage has an input connected to the output of the first digital timing element and has an output. A first output signal at the output terminal of the first digital timing element can be generated from an input signal at the input of the first digital timing element and serves for the control of the first pre-driving stage. A second pre-driving stage has an input connected to an output of the third digital timing element and has an output. A second output signal is generated via the second digital timing element and the third digital timing element. Said second output signal is fed to the second pre-driving stage. A third transistor has a base connected to the second pre-driving stage and has an emitter and a collector. A second transistor has a base connected to the collector of the third transistor and has an emitter and a collector. An electromagnetic coil has a first terminal and a second terminal connected to the collector of the second transistor. A capacitor has a first terminal connected to the first terminal of the electromagnetic coil and has a second terminal connected to the base of the second transistor.

An adjustable resistor can be connected between the emitter of the second transistor and the second terminal of the capacitor. A third Zener diode can be connected between the base of the second transistor and the second terminal of the capacitor. A fifth resistor can be connected between the base of the second transistor and the collector of the first transistor.

A first Zener diode can be connected between the first terminal of the electromagnetic coil and the second terminal of the capacitor. A second diode can be connected between the second terminal of the capacitor and the collector of the second transistor.

A first transistor having a base can be connected to the output of the first predriving stage, an emitter and a collector can be connected to the second terminal of the electromagnetic coil. A first resistor can be connected between the emitter of the first transistor and ground. A fourth Zener diode can be connected between the base of the first transistor and ground. A connection of the emitter of the third transistor can be connected to ground.

A fourth resistor having a first terminal and a second terminal can be connected to the output of the first pre-driving stage. A first direct current voltage source can be connected to the first terminal of the fourth resistor.

A sixth resistor having a first terminal and a second terminal can be connected to the output of the second pre-driving stage. A second direct-current voltage source can be connected to the first terminal of the sixth resistor.

As a further invention aspect, there is provided a method for driving a coil of a matrix printer comprising the generating of a signal in a character-generator. The signal is fed from the character-generator to a first digital timing element. A pulse time signal is generated in the first digital timing element. The pulse time signal is fed to a first pre-driving stage and to a second digital timing element. A charge time signal is generated in the second digital timing element. The charge time signal is fed to a third digital timing element. A discharge time signal is generated in the third digital timing element. The charge time signal and the discharge time signal are fed to a second pre-driving stage. An output of the second pre-driving stage is fed to a base of a third transistor having an emitter and a collector. A collector signal from the third transistor is fed to a base of a second transistor having an emitter and a collector. A current is limited in an electromagnetic coil having a second terminal connected to the collector of the second transistor by a current limiting circuit. A first transistor having a collector connected to the second terminal of the electromagnetic coil and having a base and an emitter is blocked after passage of a pulse time period. Electrical energy stored in the electromagnetic coil is discharged into a capacitor having a first terminal connected to a first terminal of the electromagnetic coil and having a second terminal connected to the base of the second transistor during a charging time.

The energy stored in the electromagnetic coil can be discharged into the capacitor via a second diode. The voltage at the capacitor can be limited with a first Zener diode for overvoltage protection of the first transistor. The third digital timing element can be started after passage of the charging time. The second transistor conductive for passing a discharge current from the capacitor through the second transistor and through the electromagnetic coil can be turned until the third digital timing element generates a discharge timing signal.

Both analog as well as digital circuits are available for the realization of the invention. A particularly advantageous drive circuit according to the invention results where, in each case, digital timing elements for the pulse time, the charging time and the discharge time, are provided between a character-generator and the electromagnetic coil. A first output signal can be generated from an input signal at an output of the timing element with a delay time member for the pulse time and can serve for the control of a pre-drive stage of the current limiting circuit. A second output signal can be generated via the input signal and via the delay members connected with the timing elements, which second output signal is connected via a second driver stage and a transistor to a charge or, respectively, a discharge stage for the capacitor or, respectively, the electromagnetic coil.

An improvement of the invention comprises that the charge or, respectively, discharge stage comprises a Zener diode connected in parallel to the capacitor, a transistor of the discharging stage with its base connected to the collector of the transistor of the current-limiting stage, which transistor is connected with its collector connection via an adjustable resistor to the capacitor and to the Zener diode, with its base via a diode to the capacitor, and with its emitter via a diode to the Zener diode and to the electromagnetic coil, and that the electromagnetic coil is connected with its second connection to the capacitor, and the capacitor-side connection to the Zener diode.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

An embodiment of the invention is illustrated in the drawing and is described in more detail in the following:

FIG. 1a shows a sectional side view of an electromagnet-coil permanent-magnet system in the rearward launching position (zero position);

FIG. 1b shows a current time diagram for the electromagnet-coil permanent-magnet system of FIG. 1a;

FIG. 2a shows a sectional side sectional view of an electromagnet coil permanent magnet system during the passage of current through the electromagnetic coil;

FIG. 2b illustrates a current time diagram or, respectively a time path distance diagram for an armature of the printing element;

FIG. 3a is a side view of an electromagnet-coil permanent-magnet system upon switching off of the current of the electromagnetic coil;

FIG. 3b is a current time diagram and a time distance diagram for the armature or, respectively, the printing element as illustrated in FIG. 3a;

FIG. 4a is side view of the electromagnet-coil permanent-magnet system according of this invention after the switching off of the current of the electromagnetic coil;

FIG. 4b is a current time or, respectively, a time distance diagram for the armature or, respectively, the printing element, of the electromagnetic-coil permanent-magnet system of FIG. 4a;

FIG. 5 illustrates a switching circuit for the generation of the input and output signals in the region of the timing elements;

FIG. 6a is a voltage-time-diagram for the impulse time;

FIG. 6b is a voltage-time-diagram for the charge time;

FIG. 6c is a voltage-time-diagram for the adjustable discharge time, and

DESCRIPTION OF INVENTION AND PREFERRED EMBODIMENT

Figure 7:
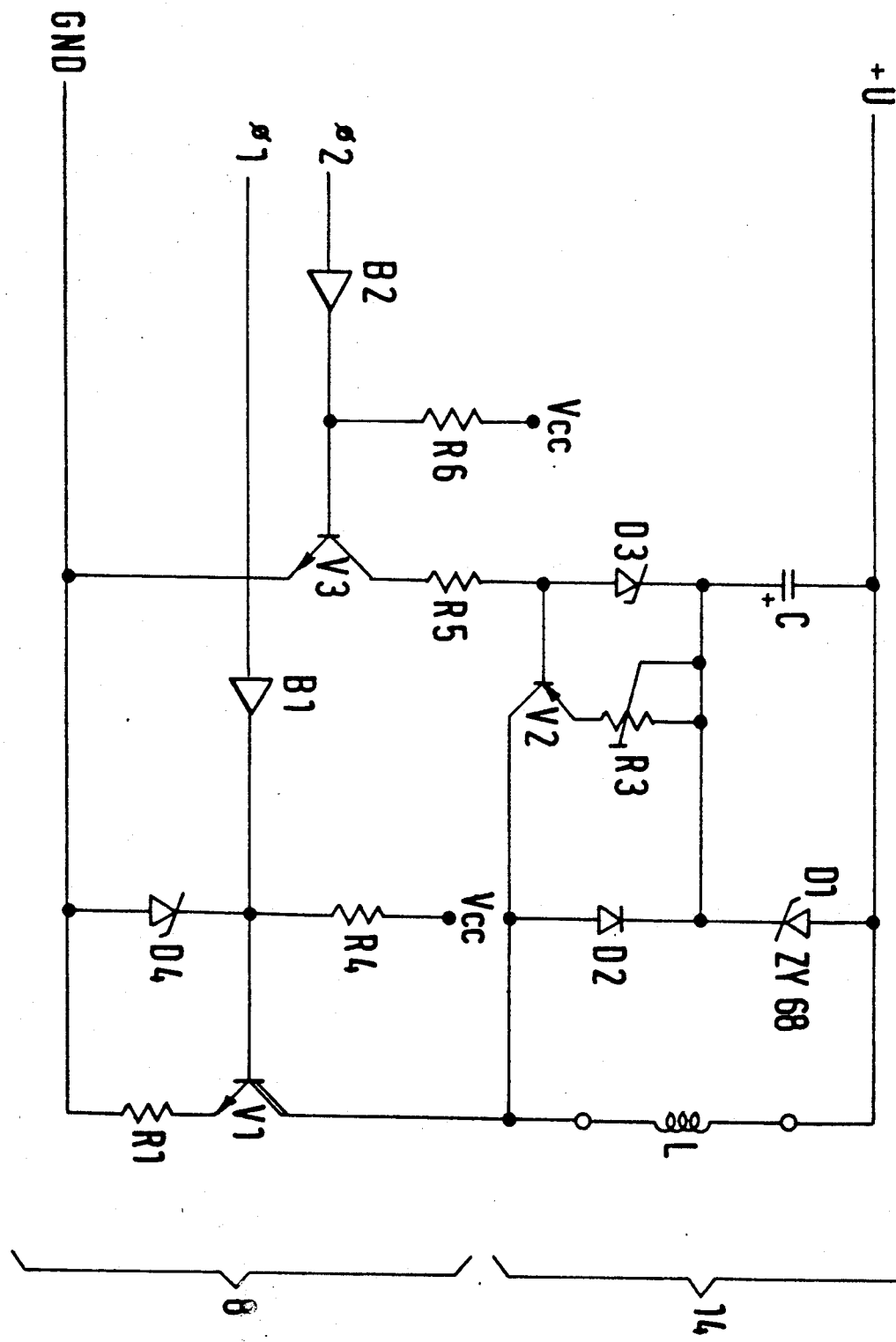
FIG. 7 illustrates the circuit for the current limitation or, respectively for the charging and discharging state following a switching for the current limitation.

The electromagnet-coil permanent-magnet system comprises, in its base form illustrated in FIGS. 1 to 4a, in each case, a base plate 1, an electromagnetic coil L with an electromagnetic core 2, a permanent magnet 3, an magnetizable armature 4, magnetizing at least partly in the region disposed opposite to the electromagnetic core 2, where the magnetizable armature 4 is spring-supported. The spring force can be generated by a spring plate or, respectively, a spring arm 5. A print element 6, for example, a print needle 6a, is attached at the armature 4.

According to FIG. 1a, the electromagnetic coil L is without current. For this reason, the permanent magnet 3 maintains the armature 4 solidly at the electromagnetic core 2. This state is characterized in the current-time-diagram of FIG. 1b by t=zero.

The electromagnetic coil L is fed with current according to FIG. 2a, such that the electromagnetic field of the magnet field or, respectively, its magnetic flux, balances the permanent magnet 3 and allows to shoot off the print element 6 with the spring force of the spring lever 5. The current course 7, based on a current limiting circuit 8 (FIG. 7) still to be explained, is limited in its height and breaks off fairly abruptly after a pulse time t1. Correspondingly, the path-time course 9 of the print element 6 or, respectively, of the armature 4, is illustrated in FIG. 2b. The dashed vertical line indicates the point t1 in time. The quickly decreasing current flank 10 forms the cause for this.

Subsequent to this decrease of the current (J) flank 10 (FIG. 2b), i.e. after the pulse time t1, the print element 6 and a certain springing part of the armature 4 oscillate, in the way illustrated in FIG. 3b with path (S)-time (t) diagram, such that the oscillation curve 11 is generated. As illustrated, undesired sections occur, such as, for example, the course of the curve 12.

A major effect of the invention occurs at this stage as illustrated in FIGS. 3a and 4a. After a charge time t2 for the capacitor C, a discharge time t3 of negative current is provided according to the current-time-diagram illustrated in FIG. 4b. This means that the voltage is applied to the capacitor C which is directed oppositely to that applied during the time period t1. Thus, the course of the curve 12 of the path-time-diagram is decreased to a negligible pulse curve 12a. Thus, the harmful afteroscillation features of the armature 4 or, respectively, of the print element 6 are eliminated to such an extent that each individual print element is ready faster by from about 10 to 15% for a subsequent launching as compared to the present.

The drive system for a printer comprises a current-limiting circuit 8, a rapidly rising current is limited by a relatively high voltage, and a current flank 10 decaying to zero after a first pulse time t1, as well as a capacitor C storing electric energies. A discharge time t3 for the feeding back of the discharge current from the capacitor C into the electromagnetic coil L and via a resistor R3 and a transistor V2 into the capacitor C is following a charging time t2 for a capacitor C, said charging time occurring subsequent to the first pulse time t1. The discharge time t3 for the capacitor C can be set.

In each case, digital timing elements T1, T2, T3 for the pulse time t1, the charge time t2, and the discharge time t3, are provided between a character-generator and the electromagnetic coil L, where a first output signal $\phi 1$ can be generated from an input signal 13 at an output Q of the time member T1 with a delay member RC1 for the pulse time t1 and serves for the control of a pre-driving stage B1 of the current-limiting circuit 8. A second output signal $\phi 2$ can be generated via delay members RC2 and RC3 connected via the input signal 13 and via time-delay members T2, T3. Said second output signal $\phi 2$ can be connected via a second a pre-driving stage B2 and a transistor V3 to a charging or, respectively, discharging stage 14 for the capacitor C or, respectively, the electromagnetic coil L.

The charge or, respectively, discharge stage 14 can comprise a Zener diode D1 connected in parallel to the capacitor C, and a transistor V2 connected to the collector of the transistor V3 with its base. Said transistor V2 can be connected with its collector connection via an adjustable resistor R3 with the capacitor C and with the Zener diode D1 with its base via a diode D3 with the capacitor C and with its emitter via a diode D2 with the Zener diode D1 and the electromagnetic coil L. The electromagnetic coil L can be connected with its second connection to the capacitor C and the connection at the capacitor side with the Zener diode D1.

A particularly advantageous drive circuit is illustrated in FIGS. 5 and 7. The input signal 13 coming from a, not further illustrated, character-generator (compare FIG. 5) passes through a digital timing element T1, to which a delay member RC1 is connected, to an output Q, and the input signal 13 is picked up ahead of the entering into the second timing element T2 and forms a signal $\phi 1$, noted in FIG. 5. The pulse time t1 is determined, according to FIG. 6a, by the time member T1 and by a time member T2 with adjustable delay member RC2, and the charge time t2 (FIG. 6b) is determined via the output Q. The adjustable timing element t3 (FIG. 6c) is determined via the timing element T3 with delay member RC3. Thus, there results a second output signal $\phi 2$, as noted in FIG. 5.

The timing elements T1, T2, T3 can be provided by monoflops or, alternatively, by an RC-delay member. These devices can serve as timing elements which release a signal after a predetermined time period.

For example, the pulse time amounts to t1=250 microseconds, the charge time t2=50 microseconds, and the discharge time t3=150 microseconds for the embodiment illustrated in the figures. These values can change depending on the ratios of the electromagnetic-coil permanent-magnet system or, respectively of a hinged clapper-armature system.

The time period t1 can be from about 200 to 220 microseconds, the time period t2 can be from about 20 to 50 microseconds, the time period t3 can be from about 50 to 200 microseconds. Alternatively, the time period t1 can be 4 to 10 times the time period t2 and the time period t1 can be 1 to 5 times the time period t3.

If the input A of the time delay member T1 is driven with a signal 13, then the output Q (Signal $\phi 1$) is set to logical "1". This signal controls a transistor V1 via a pre-driving stage B1, as illustrated in FIG. 7. The now increasing current by the resistor R1, the timing element T1, and the electromagnetic coil L is limited by the current limiting circuit 8, which comprises a diode D4 and the resistor R1 as well as the transistor V1, as can be recognized from FIGS. 2b, 3b and 4b.

The transistor V1 is blocked after the pulse time t1 comes to an end, by interrupting the current flow through the transistor V1 itself. The electrical energy, stored in the inductivity of the electromagnetic coil L, is discharged over very quickly via a diode D2 into the capacity of the capacitor C, because this current circuit is of low resistance. A Zener diode D1 limits, in this case, the voltage U at the capacitor C and serves as a protection against overvoltage at the transistor V1, where the base current of the transistor V1 is determined by the resistor R4. Simultaneously, the timing element T2 is started after the end of the pulse time t1, which timing element T2 activates the timing element T3 after the end of the time period t2 and initiates the energy feed back as follows:

A transistor V3 is driven with the output signal $\phi 2$ via a second pre-driver stage B2, which second pre-driver stage B2 is provided with a drive resistor R6. Thereby a transistor V2 becomes conductive via a resistor R5, and the discharge current flows from the capacitor C via the adjustable resistor R3, the transistor V2, and the inductivity of the electromagnetic coil L back into the capacitor, until this capacitor C is discharged, respectively, the discharge time t3 has terminated. The discharge current can be limited, or can be set to the required size, with the resistor R3, a diode D3, and a transistor V2. The transistor V2, the Zener diode D1, the diode D2, the Zener diode D3, and the resistor R3 form the first mentioned charging or, respectively, discharging stage 14.

It will be understood that each of the elements described above, or two or more together, may also find a useful application in other types of electrical drive and printer systems differing from the types described above.

While the invention has been illustrated and described as embodied in the context of a driver circuit for a printer, in particular for a matrix printer of the needle-type or the hammer-type construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive circuit for a coil in a printer comprising
   a first digital timing element having an input terminal to be directly connected to a character-generator and an output terminal for a pulse time signal and including a first delay member for the pulse time;
   a second digital timing element having an input and an output and including a second delay member for the charge time signal directly connected with the input to the output of the first digital timing element;
   a third digital timing element having an input and an output and including a third delay member for the discharge time signal directly connected with the input to the output of the second digital timing element;
   a pre-driving stage having an input directly connected to the output of the first digital timing element and having an output, wherein a first output signal at the output terminal of the first digital timing element can be generated from an input signal at the input of the first digital timing element and serves for the control of the first pre-driving stage;
   a second pre-driving stage having an input directly connected to an output of the third digital timing element and having an output, wherein a second output signal is generated via the second digital timing element and the third digital timing element, which second output signal is fed to the second pre-driving stage;
   a third transistor having a base directly connected to the second pre-driving stage and having an emitter and a collector;
   a second transistor having a base connected to the collector of the third transistor and having an emitter and a collector;
   an electromagnetic coil having a first terminal and having a second terminal directly connected to the collector of the second transistor;
   a capacitor having a first terminal directly connected to the first terminal of the electromagnetic coil and having a second terminal connected to the base of the second transistor.

2. The drive circuit for a coil according to claim 1 further comprising
   an adjustable resistor directly connected between the emitter of the second transistor and the second terminal of the capacitor;
   a third Zener diode directly connected between the base of the second transistor and the second terminal of the capacitor;
   a fifth resistor directly connected between the base of the second transistor and the collector of the third transistor.

3. The drive circuit for a coil according to claim 1 further comprising
   a first Zener diode directly connected between the first terminal of the electromagnetic coil and the second terminal of the capacitor;
   a second diode directly connected between the second terminal of the capacitor and the collector of the second transistor.

4. The drive circuit for a coil according to claim 1 further comprising
   a first transistor having a base directly connected to the output of the first predriving stage, an emitter and a collector directly connected to the second terminal of the electromagnetic coil;
   a first resistor directly connected between the emitter of the first transistor and ground;
   a fourth Zener diode directly connected between the base of the first transistor and ground;
   a connection of the emitter of the third transistor to ground.

5. The drive circuit for a coil according to claim 1 further comprising
   a fourth resistor having a first terminal and a second terminal directly connected to the output of the first pre-driving stage;
   a first direct-current voltage source directly connected to the first terminal of the fourth resistor.

6. The drive circuit for a coil according to claim 1 further comprising
- a sixth resistor having a first terminal and a second terminal directly connected to the output of the second pre-driving stage;
- a second direct current voltage source directly connected to the first terminal of the sixth resistor.

7. The drive circuit for a coil according to claim 1 further comprising
- an adjustable resistor directly connected between the emitter of the second transistor and the second terminal of the capacitor;
- a third Zener diode directly connected between the base of the second transistor and the second terminal of the capacitor;
- a fifth resistor directly connected between the base of the second transistor and the collector of the third transistor;
- a first Zener diode directly connected between the first terminal of the electromagnetic coil and the second terminal of the capacitor;
- a second diode directly connected between the second terminal of the capacitor and the collector of the second transistor;
- a first transistor having a base directly connected to the output of the first predriving stage, an emitter and a collector directly connected to the second terminal of the electromagnetic coil;
- a first resistor directly connected between the emitter of the first transistor and ground;
- a fourth Zener diode directly connected between the base of the first transistor and ground;
- a connection of the emitter of the third transistor to ground;
- a fourth resistor having a first terminal and a second terminal directly connected to the output of the first pre-driving stage;
- a first direct current voltage source directly connected to the first terminal of the fourth resistor;
- a sixth resistor having a first terminal and a second terminal directly connected to the output of the second pre-driving stage;
- a second direct-current voltage source directly connected to the first terminal of the sixth resistor.

* * * * *